United States Patent Office 2,771,463
Patented Nov. 20, 1956

2,771,463

CATALYTIC PROCESS FOR ETHYLENE EMPLOYING NICKEL ON CARBON AND ALKALI METAL

Edmund Field, Chicago, and Morris Feller, Park Forest, Ill., assignors to Standard Oil Company, Chicago, Ill., a corporation of Indiana No Drawing. Application August 20, 1953,
Serial No. 375,560

17 Claims. (Cl. 260—94.9)

This invention relates to a process for the conversion of ethylene to normally solid resinous, wax-like and grease-like hydrocarbon products by contact with an alkali metal and a nickel-carbon catalyst.

One object of our invention is to provide novel and highly useful catalysts for the preparation of high molecular weight polymers from ethylene-containing gas mixtures. Another object is to provide a relatively low-temperature, low-pressure process for the conversion of ethylene in substantial yields into high molecular weight normally solid polymers having molecular weights ranging upwardly from 300. These and other objects of our invention will become apparent from the following description thereof.

Briefly, the inventive process comprises the conversion of ethylene in substantial yields to high molecular weight polymers having a molecular weight of at least 300 and including grease-like, wax-like and tough, resinous ethylene polymers, by contacting ethylene with sodium or other alkali metal and a nickel-activated carbon catalyst which comprises essentially elemental nickel in a minor proportion, usually between about 0.1 and about 20 weight percent, and a major proportion of activated carbon, preferably a coconut charcoal. The contacting is effected at temperatures within the range of about 25° C. to about 250° C. It is highly desirable to supply to the reaction zone a liquid medium which serves both as a reaction medium and a solvent for the solid reaction products. Suitable liquid reaction media for polymerization include various hydrocarbons, particularly an aromatic hydrocarbon such as benzene, toluene or xylenes. The conversion of ethylene can be effected in the absence of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use. The ethylene partial pressure in the reaction zone can be varied between about atmospheric pressure and 15,000 p. s. i. g. or even higher pressures, but is usually effected at pressures between about 200 and 5000 p. s. i., or most often at about 1000 p. s. i.

The practice of the process of the present invention leads to ethylene polymers of widely variant molecular weight ranges and attendant physical and mechanical properties, dependent upon the selection of operating conditions. The inventive process is characterized by extreme flexibility both as regards operating conditions and as regards the products producible thereby. Thus the present process can be effected over extremely broad ranges of temperature and pressure. The practice of the present process can lead to grease-like ethylene homopolymers having an approximate molecular weight range of 300 to 700, wax-like ethylene homopolymers having an approximate specific viscosity ($\times 10^5$) between about 1000 and 10,000, and tough, resinous ethylene homopolymers having an approximate specific viscosity ($\times 10^5$) of 10,000 to more than 300,000 [($\eta$ relative -1)$\times 10^5$]. By the term "tough, resinous polyethylene" as used herein, we mean polymer having a brittle point below −50° C. (A. S. T. M. Method D746–51T), impact strength greater than two foot pounds per inch of notch (A. S. T. M. Method D256–47T—Izod machine) and minimum elongation at room temperature (25° C.) of 100%.

Other reactive materials may be added to ethylene, particularly propylene or other mono-olefinic hydrocarbons such as n-butylenes, isobutylenes, t-butylethylene; acetylene, butadiene, isoprene, and the like, usually in proportions between about 1 and about 25% by weight, based on the weight of ethylene.

An important feature of the present invention is employment of an alkali metal, viz. lithium, sodium, potassium, rubidium or cesium. We may employ mixtures of the alkali metals such as sodium-potassium eutectic or other alloys comprising alkali metals. The inclusion of the alkali metal with the nickel catalyst results in increased yields of solid polymers of ethylene. The nickel catalyst, when employed with sodium or other alkali metal, functions well in the presence of large proportions of liquid reaction medium, the life of the nickel polymerization catalyst is extended and polymers having desirable ranges of physical and chemical properties can be readily produced.

The proportion of sodium or other alkali metal employed in our process can be varied from about 0.001 to about 2 parts by weight per part by weight of nickel catalyst (total weight of solid catalyst). Usually sodium is employed in proportions between about 0.1 and about 1.0 part by weight per part by weight of the nickel catalyst. The optimum proportions can readily be determined in specific instances, by simple small-scale tests with the specific feed stocks, liquid reaction medium, reaction medium:catalyst ratio, catalyst, temperature, pressure and nature of the product which is desired.

The nickel component of the catalyst is extended upon a major proportion of an activated carbon. Thus, we may employ activated charcoals derived from cellulosic materials, particularly coconut, having surface areas between about 700 and about 1200 square meters per gram, pore volumes of about 0.53 to 0.58 cc. per gram and pore diameters of about 20 to 30 A., and, in some instances, small amounts of combined oxygen. The activated charcoal or other carbon support may be pretreated with nitric acid before use as a catalyst support in order to remove basic materials, for example, as described in E. F. Peters application for United States Letters Patent, Serial No. 164,825, filed May 27, 1950.

The preparation of nickel catalysts supported upon activated carbon, particularly coconut charcoal, is well known in the art and the preparative methods form no part of the present invention. Usually we prefer to prepare the catalyst by a cheap, simple and efficacious technique, which is described briefly hereinafter.

A suitable method of catalyst preparation involves adsorbing nickel nitrate from an aqueous solution upon a porous active carbon such as a suitable charcoal in an amount sufficient to produce the desired nickel content in the finished catalyst. The charcoal containing adsorbed nickel salt is then treated thermally to effect decomposition of nickel nitrate to form nickel oxide, suitably by heating under a partial vacuum such as 1 to 20 mm. of mercury (absolute pressure) or, preferably in the presence of steam. The resultant catalyst, comprising principally nickel oxide-charcoal, is reduced with hydrogen before use in polymerization to produce the active catalyst. Hydrogen treatment of the nickel oxide-charcoal catalyst can be effected at temperatures between about 175° C. and about 400° C., preferably about 200 to 250° C., and hydrogen pressures ranging from about 1 mm. of mercury to about 2000 p. s. i. g. for a period of time sufficient to reduce NiO in the catalyst to elemental nickel. An exemplary preparation of a nickel-charcoal catalyst is provided in the above-mentioned Peters application.

Although the nickel catalyst may contain between about 0.1 and about 20 weight percent of nickel, we usually employ catalyst containing between about 3 and about 10 weight percent of nickel.

The activated carbon support seems to play a unique role in the catalyst since we have found that other supports which might be considered prima facie equivalents, greatly reduce or virtually destroy the power of the catalyst to produce solid polymers from ethylene, viz. alumina and silica supports such as kieselguhr.

If it is desired to employ the nickel-active carbon catalyst in the form of pellets large enough to be retained on a 20-mesh sieve or at least about 0.1 inch in the largest dimension, it is desirable to pellet the nickel-carbon catalyst with between about 50 and about 95 weight percent, based on the total weight of the pellet, of a difficultly reducible metal oxide filler material such as alumina, titania, zirconia or silica. The pelleting of nickel-carbon catalyst with such porous inert supporting materials (fillers) is described in application for United States Letters Patent, Serial No. 259,508, filed on December 1, 1951 by B. L. Evering et al., which is incorporated herein by reference.

The catalyst can be employed in various forms and sizes, e. g., as powder, granules, microspheres, broken filter cake, lumps, or shaped pellets. A convenient form in which the catalysts may be employed is as granules of about 20–100 mesh/inch size range.

Although ethylene may be polymerized to produce normally solid polymers in the presence of alkali metal-nickel-charcoal catalysts even at room temperature, we prefer to employ temperatures between about 75° C. and about 150° C.

Reaction pressures may be varied within the range of about 15 p. s. i. ethylene partial pressure to the maximum ethylene partial pressure which can economically be employed in suitable commercial equipment, for example up to as much as 30,000 p. s. i. A convenient ethylene partial pressure range for the manufacture of solid polymers by the use of the present catalyst is about 200 to about 5000 p. s. i., which constitutes a distinct advantage over the commercial high pressure ethylene polymerization processes which apparently require operating pressures in the range of about 20,000 to about 50,000 p. s. i.

An important advantage which accrues to the conjoint employment of alkali metal and nickel-charcoal catalyst is the fact that high solvent:catalyst ratios may be employed, for example ratios between about 5 and about 3000 cc. of solvent per gram of catalyst, under which conditions a markedly reduced yield of solid ethylene polymer would be obtained in the absence of the alkali metal.

The charging stock to the present polymerization process preferably comprises essentially ethylene. The ethylene charging stocks may contain inert hydrocarbons, as in refinery gas streams, for example, methane, ethane, propane, etc. However, it is preferred to employ as pure and concentrated ethylene charging stocks as it is possible to obtain. It is desirable to minimize or avoid the introduction of oxygen, carbon dioxide, water or sulfur compounds into contact with the catalyst.

The contact time or space velocity employed in the polymerization process will be selected with reference to the other variables, catalyst, the specific type of product desired and the extent of ethylene conversion desired in any given run or pass over the catalyst. In general, this variable is readily adjustable to obtain the desired results. In operation in which the olefin charging stock is caused to flow continuously into and out of contact with the solid catalyst suitable liquid hourly space velocities are usually selected between about 0.1 and about 10 volumes, preferably about 0.5 to 5 or about 2 volumes of olefin solution in a liquid reaction medium, which is usually an aromatic hydrocarbon such as benzene or xylenes; tetralin or other cycloaliphatic hydrocarbon, such as cyclohexane or decalin (decahydronaphthalene).

The amount of ethylene in such solution may be in the range of about 2 to 50% by weight, preferably about 2 to about 10 weight percent or, for example, about 5 to 10 weight percent. When the ethylene concentration in the liquid reaction medium is decreased below about 2 weight percent, the molecular weight and melt viscosity of the polymeric products tend to drop sharply. In general, the rate of ethylene polymerization tends to increase with increasing concentration of the ethylene in the liquid reaction medium. However, the rate of ethylene polymerization to form high molecular weight, normally solid polymers is preferably not such as to yield said solid polymers in quantities which substantially exceed the solubility thereof in said liquid reaction medium under the reaction conditions, usually up to about 5–7 weight percent, exclusive of the amounts of polymeric products which are selectively adsorbed by the catalyst. Although ethylene concentrations above 10 weight percent in the liquid reaction medium may be used, solutions of ethylene polymer above 5–10% in the reaction medium become very viscous and difficult to handle and severe cracking or spalling of the catalyst particles or fragments may occur, resulting in catalyst carry-over as fines with the solution of polymerization products and extensive loss of catalyst from the reactor.

In batch operations, operating periods between one-half and about 20 hours, usually between about 1 and about 4 hours, are employed and the reaction autoclave is charged with ethylene as the pressure falls as a result of the olefin conversion reaction.

The solvent:catalyst weight ratio can be varied in the range of about 5 to about 3000, or even higher for flow systems. The employment of high solvent:catalyst ratios, which is rendered possible by the presence of an alkali metal, is very important in obtaining substantial yields of polymer.

The olefin charging stocks can be polymerized in the gas phase and in the absence of a liquid reaction medium by contact with the alkali metals and nickel-charcoal catalysts. Upon completion of the desired polymerization reaction it is then possible to treat the solid catalyst for the recovery of the solid polymerization products, for example by extraction with suitable solvents. However, in the interests of obtaining increased rates of olefin conversion and of continuously removing solid conversion products from the catalyst, it is much preferred to effect the conversion of the olefin in the presence of suitable liquid reaction media. The liquid reaction medium may also be employed as a means of contacting the olefin with catalyst by preparing a solution of the olefin feed stock in the liquid reaction medium and contacting the resultant solution with the polymerization catalyst.

The liquid reaction medium functions as a solvent to remove some of the normally solid product from the catalyst surface.

Various classes of hydrocarbons or their mixtures which are liquid and substantially inert under the polymerization conditions of the present process can be employed. Members of the aromatic hydrocarbon series, particularly the mononuclear aromatic hydrocarbons, viz., benzene, toluene, xylenes, mesitylene and xylene-p-cymene mixtures can be employed. Tetrahydronaphthalene can also be employed. In addition, we may employ such aromatic hydrocarbons as ethylbenzene, isopropylbenzene, sec-butylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

Certain classes of aliphatic hydrocarbons can also be employed as a liquid hydrocarbon reaction medium in the present process. Thus, we may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalins and the like.

We may also employ a liquid hydrocarbon reaction medium comprising liquid olefins, e. g., n-hexenes, cyclohexene, octenes, hexadecenes and the like.

The normally solid polymerization products which are retained on the catalyst surface or grease-like ethylene polymers may themselves function to some extent as a liquefied hydrocarbon reaction medium, but it is highly desirable to add a viscosity-reducing hydrocarbon, such as those mentioned above, thereto in the reaction zone.

The liquid hydrocarbon reaction medium should be freed of poisons before use in the present invention by acid treatment, e. g., with anhydrous p-toluenesulfonic acid, sulfuric acid, or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

We have purified C. P. xylenes by refluxing with a mixture of 8 weight percent $MoO_3$ on $Al_2O_3$ catalyst and $LiAlH_4$ (50 cc. xylene—1 g. catalyst—0.2 g. $LiAlH_4$) at atmospheric pressure, followed by distillation of the xylenes. Still more effective purification of solvent can be achieved by heating it to about 225–250° C. with either sodium and hydrogen or NaH plus 8 weight percent $MoO_3$-$Al_2O_3$ catalyst in a pressure vessel.

Temperature control during the course of the ethylene conversion process can be readily accomplished owing to the presence in the reaction zone of a large liquid mass having relatively high heat capacity. The liquid hydrocarbon reaction medium can be cooled by heat exchange inside or outside the reaction zone.

When solvents such as xylenes are employed some slight alkylation thereof by ethylene can occur under the reaction conditions. The alkylate is removed with grease in the present process, can be separated therefrom by fractional distillation and can, if desired, be returned to the polymerization zone.

The following specific examples are introduced in order to illustrate but not unduly to limit our invention. The exemplary operations were effected in stainless steel pressure vessels provided with a magnetically-actuated stirring device which was reciprocated through the liquid in the vessel in order to obtain good contacting of the ethylene and catalyst components.

*Example 1*

The 100 cc. reactor was charged with 50 cc. of pure, freshly distilled decalin, 0.1 g. of sodium and 1 g. of powdered (less than 325 mesh) nickel catalyst. The catalyst was 5 weight percent of metallic nickel on a commercial activated coconut charcoal, which was prepared by imbibing a solution of nickelous nitrate hexahydrate in the charcoal, subjecting the $Ni(NO_3)_2$-charcoal to heat in the presence of steam (at 482.2° C.) to effect decomposition of the nitrate to form NiO-charcoal and reduction of the latter with hydrogen at 200° C. for 16 hours at atmospheric pressure. The mixture in the reactor was heated to 125° C. under a blanket of hydrogen, and commercial dehydrated and decarbonated ethylene was then introduced to an ethylene pressure of 1040 p. s. i. Reaction was continued for 45 minutes, resulting in ethylene pressure drop of 425 p. s. i. The reaction was discontinued because the reaction vessel was jammed with ethylene polymer which prevented the stirrer from functioning. The reaction yielded 2.56 grams of resinous ethylene polymer per gram of the nickel-charcoal catalyst, said polymer having a specific viscosity of 17,600, density at 24° C. of 0.9486 and melt viscosity of $7.9 \times 10^5$ poises. The polyethylene was molded into a tough and flexible film. Also produced was a solid, grease-like ethylene polymer in the yield of 0.8 gram per gram of nickel catalyst.

*Example 2*

The 100 cc. reactor was charged with 1 gram of nickel-charcoal catalyst of the same composition and manufacture as that employed in Example 1, 0.1 g. of sodium and 50 cc. of purified xylenes. The reactor contents were heated to 125° C. under a blanket of hydrogen, and commercial dehydrated and decarbonated ethylene was then introduced to an ethylene pressure of 1030 p. s. i. Reaction was continued for 60 minutes, over the course of which the ethylene pressure drop was 410 p. s. i. The reaction yielded 1.80 grams of a tough, resinous polyethylene per gram of nickel-charcoal catalyst, said polymer having a specific viscosity of 21,300 melt viscosity of $1.15 \times 10^6$ poises and density at 24° C. of 0.9533. The resinous polyethylene was molded into a tough and flexible film. The reaction also yielded 0.91 gram of a solid, grease-like ethylene polymer per gram of catalyst.

*Example 3*

The 100 cc. reactor was charged with 1 gram of the powdered nickel-charcoal catalyst of the same composition (reduced with hydrogen at 220° C., 16 hours, 1 atmosphere) as that employed in Example 1, 0.2 g. of sodium and 50 cc. of purified xylenes. The reactor contents were heated to 102° C. under a blanket of hydrogen and ethylene was then introduced to a partial pressure of 125 p. s. i. Reaction was continued for 300 minutes, with intermittent introduction of ethylene into the reactor, the total ethylene pressure drop being 445 p. s. i. The reaction yielded 1.24 grams of resinous polyethylene per gram of catalyst, said polyethylene having a specific viscosity of 44,700, melt viscosity of $9.8 \times 10^4$ poises and density at 24° C. of 0.9442. The reaction also yielded 0.41 gram per gram of catalyst of a grease-like polyethylene.

*Example 4*

The 250 cc. reactor was charged with 100 cc. of pure decalin, 0.1 g. of sodium and 1 g. of a catalyst having the composition, 1 weight percent nickel, 9 weight percent activated coconut charcoal and 90 weight percent zirconia, prepared as described in Evering et al., Serial No. 259,508, and reduced before use with hydrogen for 16 hours at 225° C. and atmospheric pressure. The nickel catalyst was employed in the form of 60–100 mesh particles. The reactor contents were heated to 120° C. to disperse the sodium throughout the decalin, then cooled to 75° C., both operations being conducted under a blanket of hydrogen. Ethylene was then introduced to a partial pressure of 1025 p. s. i. and reaction was continued for 245 minutes, resulting in ethylene pressure drop of 360 p. s. i. The reaction yielded 2.35 grams of solid, resinous polyethylene per gram of the Ni-C-$ZrO_2$ catalyst, said polymer having a specific viscosity of 39,500, melt viscosity of $1 \times 10^7$ poises and density at 24° C. of 0.9472. The resinous polymer was molded into a tough and flexible film. Also produced were 0.26 gram per gram of catalyst of a solid, grease-like ethylene polymer.

*Example 5*

The 100 cc. reactor was charged with 50 cc. of pure decalin, 0.1 g. of sodium and 1 g. of hydrogen-reduced nickel catalyst of the same composition and manufacture as that used in Example 4. The reactor contents were heated under a blanket of hydrogen to 102° C. and ethylene was then introduced to a partial pressure of 1005 p. s. i. Operation was continued for 125 minutes, at which time the reactor was full of solid polyethylene, causing the stirrer to jam. The ethylene pressure drop during the reaction period was 70 p. s. i. It is obvious that except for mechanical failure, a much higher reaction period could have been obtained with consequent increase in the yield of solid polyethylene. The reaction yielded 0.74 gram of solid, resinous polyethylene per gram of the nickel catalyst, said solid having a specific viscosity of 43,800, melt viscosity of $9.2 \times 10^6$ poises and density at 24° C. of 0.9495. The solid polymer was molded into a tough and flexible film. The reaction also yielded 0.26 gram per gram of catalyst of a solid, grease-like ethylene polymer.

*Example 6*

The reactor charge was the same as in Example 5, but reaction was effected at 126° C., with initial ethylene pressure being the same as in Example 5. Reaction was continued for 46 hours, with intermittent introduction of ethylene into the reactor. The total ethylene pressure drop was 770 p. s. i. This reaction yielded 2.33 grams of resinous polyethylene per gram of Ni-C-ZrO$_2$ catalyst, said polyethylene having a specific viscosity of 22,700, melt viscosity of $5.9 \times 10^6$ poises and density at 24° C. of 0.9506. The resin was molded into a tough and flexible film. The reaction also yielded 0.72 gram of a solid, grease-like polyethylene per gram of the nickel catalyst.

*Example 7*

The 250 cc. reactor was charged with 100 cc. of purified toluene, 0.2 g. of lithium and 1 g. of 5% nickel-coconut charcoal which was pretreated with hydrogen at 200° C. and atmospheric pressure for 16 hours. The reactor contents were heated to 128° C. under a blanket of hydrogen and ethylene was then introduced to the pressure of 920 p. s. i. Over a reaction period of about 20 hours, the pressure drop was about 580 p. s. i. The reaction yielded 4.7 grams per gram of nickel-charcoal catalyst of a tough, extensible ethylene polymer and 0.6 gram of solid, grease-like ethylene polymer per gram of catalyst.

*Example 8*

The 250 cc. reactor is charged with 100 cc. of pure decalin, 0.01 g. of potassium and 1 g. of the nickel-charcoal catalyst employed in Example 1. The reactor contents are heated under a blanket of hydrogen at 75° C. and ethylene is then introduced to a partial pressure of 1100 p. s. i. Reaction is continued for 300 minutes to yield a high molecular weight ethylene polymer.

*Example 9*

The 250 cc. reactor was charged with 100 cc. of purified toluene, 0.1 g. of 5% nickel-coconut charcoal catalyst which had been reduced with hydrogen at atmospheric pressure for 16 hours at 200° C., and 0.1 g. of sodium. The reactor contents were heated to 127° C. under a blanket of hydrogen and commercial ethylene was then introduced to the partial pressure of 920 p. s. i. Over a reaction period of 20 hours, the reaction yielded 13.7 g. of resinous ethylene polymer per gram of catalyst, together with 5.2 g. of grease- and wax-like polymers per gram of catalyst. Repetition of the run in the absence of sodium reduced the yield of resinous polymer by 56% and the yield of grease and waxes by 71%.

*Example 10*

The 250 cc. reactor was charged with 0.1 g. of the reduced nickel catalyst prepared in the same way as the catalyst of Example 9, 100 cc. of purified toluene, and 0.1 g. of lithium. The reactor contents were heated with stirring under a blanket of hydrogen to 127° C. and ethylene was then introduced to the pressure of 930 p. s. i. Reaction was continued for a period of 20 hours. Even at the high solvent:catalyst ratio employed in this run, the yield of solid ethylene polymer was 4.5 grams per gram of catalyst and the yield of grease-like ethylene polymers was 7.7 grams per gram of catalyst.

In all the examples, melt viscosity was determined by the method of Dienes and Klemm, J. Appl. Phys. 17, 458–78 (1946), at 145° C.

An attempt was made to prepare a solid polyethylene by the use of a Ni-Al$_2$O$_3$ catalyst. The catalyst was prepared by imbibing nickelous nitrate hexahydrate from aqueous solution in an alumina gel, thereafter decomposing the imbibed nickel nitrate, drying the catalyst and calcining in air to a temperature of about 600° C. for 4 hours. The catalyst was then reduced with hydrogen at 220° C. and atmospheric pressure for 16 hours. The catalyst thus prepared contained 8 weight percent Ni. The 250 cc. reactor was charged with 100 cc. of purified xylenes, 0.5 g. of sodium and 5 g. of the reduced nickel-alumina catalyst (30–100 mesh). The reactor contents were heated under a blanket of hydrogen to 101° C. and ethylene was then introduced to the partial pressure of 1000 p. s. i. During the reaction period of 22 hours, the reaction temperature was gradually increased to a final temperature of 223° C. The total ethylene pressure drop was 1100 p. s. i. The reaction yielded only a trace of wax-like ethylene polymer (substantially insoluble in xylenes at room temperature), 0.56 gram per gram of catalyst of a grease-like ethylene polymer and 0.42 gram per gram of catalyst of alkylated xylenes. The grease-like ethylene polymers were highly soluble in xylenes at room temperature.

It will be noted that the behavior of the nickel-alumina catalyst in the presence of sodium is markedly different from the behavior of nickel-charcoal catalysts, as respects the formation of resinous, high molecular weight polyethylenes. The results obtained with the nickel-alumina catalysts are also in marked contrast to the results presented in the above examples, wherein a metal oxide similar to alumina was employed as a filler for nickel-charcoal, viz. the examples relating the employment of nickel-charcoal-zirconia catalysts. It would appear that nickel and charcoal undergo some specific interaction which yields a catalyst capable of producing resinous, high molecular weight polyethylenes having relatively low solubilities even in hot xylenes, rather than wax-like or grease-like polyethylenes which are far more soluble in hot xylenes.

In large scale operations the flow-scheme shown in the Peters et al. application, Serial No. 222,802, filed April 25, 1951, may be employed. It should be noted that the higher molecular weight polyethylenes produced in our process are selectively adsorbed by the nickel-charcoal catalyst and may be removed therefrom by solvent extraction as described in the aforesaid Peters et al. application.

The polymers produced by the process of this invention can be subjected to such after-treatment as may be desired, to fit them for particular uses or to impart desired properties. Thus, the polymers can be extruded, mechanically milled, filmed or cast, or converted to sponges or lattices. Antioxidants, stabilizers, fillers, extenders, plasticizers, pigments, insecticides, fungicides, etc. can be incorporated in the polyethylenes and/or in byproduct alkylates or "greases." The polyethylenes may be employed as coating materials, binders, etc.

The polymers produced by the process of the present invention, especially the polymers having high specific viscosities, can be blended with the lower molecular weight polyethylenes to impart stiffness or flexibility or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about .01 and about 1 percent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products having a molecular weight of 50,000 or more produced by the present invention, can be employed in small proportions to substantially increase the viscosity of fluent liquid hydrocarbon oils and as gelling agents for such oils. The solution of about 1 gram of an ethylene polymer having a specific viscosity $\times 10^5$ of about 50,000 in about one liter of xylenes at a temperature close to the boiling point produces an extremely viscous solution.

The polymers produced by the present process can be subjected to chemical modifying treatments, such as halogenation, halogenation followed by dehalogenation, sulfohalogenation by treatment with sulfuryl chloride, sulfonation, and other reactions to which hydrocarbons may be subjected.

Having thus described our invention, what we claim is:

1. A process for the preparation of an ethylene polymer having a molecular weight of at least about 300, which process comprises contacting ethylene with catalytically effective amounts of an alkali metal and a catalyst comprising essentially a minor proportion of nickel supported upon a major proportion of an active carbon at a temperature between about 25° C. and about 250° C., and separating an ethylene polymer having a molecular weight of at least about 300 thus produced.

2. A process for the preparation of an ethylene polymer having a molecular weight of at least about 300, which process comprises contacting ethylene with catalytically effective amounts of an alkali metal and a catalyst comprising essentially a minor proportion of nickel supported upon a major proportion of an active carbon in the presence of a liquid hydrocarbon reaction medium at a temperature between about 25° C. and about 250° C., and separating an ethylene polymer having a molecular weight of at least about 300 thus produced.

3. The process of claim 2 wherein said catalyst comprises between about 0.1 and about 20 weight percent nickel.

4. The process of claim 2 wherein said alkali metal is sodium.

5. The process of claim 2 wherein said alkali metal is lithium.

6. The process of claim 2 wherein said alkali metal is potassium.

7. The process of claim 2 wherein said medium is an aromatic hydrocarbon.

8. A process for the preparation of a normally solid ethylene polymer, which process comprises contacting ethylene and a liquid hydrocarbon reaction medium at a temperature between about 25° C. and about 250° C. under an ethylene partial pressure of at least about 15 p. s. i. with an alkali metal and a catalyst comprising essentially between about 3 and about 15 weight percent of nickel, as elemental nickel, supported upon an active carbon, the ratio of said alkali metal to said nickel catalyst being between about 0.001 and about 2, and separating a normally solid ethylene polymer thus produced.

9. The process for the preparation of a resinous ethylene polymer having a melt viscosity between about $10^5$ and $10^7$ poises, which process comprises contacting ethylene and a liquid hydrocarbon reaction medium at a temperature between about 75° C. and about 150° C. under an ethylene partial pressure of at least about 100 p. s. i., with an alkali metal and a catalyst comprising essentially a minor proportion of nickel supported upon a major proportion of an activated coconut charcoal, the weight ratio of alkali metal to said nickel catalyst being between about 0.1 and about 1.0, and separating a tough, resinous ethylene polymer thus produced.

10. The process of claim 8 wherein said alkali metal is sodium.

11. The process of claim 8 wherein said alkali metal is lithium.

12. The process of claim 8 wherein said alkali metal is potassium.

13. A process for the preparation of a normally solid ethylene polymer, which process comprises contacting ethylene at a temperature between about 25° C. and about 250° C. under an ethylene partial pressure of at least about 15 p. s. i. with an alkali metal and a catalyst comprising essentially between about 3 and about 15 weight percent of nickel, as elemental nickel, supported upon an active carbon, the ratio of said alkali metal to said nickel catalyst being between about 0.001 and about 2, and separating a normally solid ethylene polymer thus produced.

14. The process for the preparation of a resinous ethylene polymer having a melt viscosity between about $10^5$ and $10^7$ poises, which process comprises contacting ethylene at a temperature between about 75° C. and about 150° C. under an ethylene partial pressure of at least about 100 p. s. i., with an alkali metal and a catalyst comprising essentially a minor proportion of nickel supported upon a major proportion of an activated coconut charcoal, the weight ratio of alkali metal to said nickel catalyst being between about 0.1 and about 1.0, and separating a tough, resinous ethylene polymer thus produced.

15. The process of claim 13 wherein said alkali metal is sodium.

16. The process of claim 13 wherein said alkali metal is lithium.

17. The process of claim 13 wherein said alkali metal is potassium.

References Cited in the file of this patent

UNITED STATES PATENTS 2,658,059    Peters et al. _____ Nov. 13, 1953